United States Patent [19]

Gould

[11] Patent Number: 5,533,785
[45] Date of Patent: Jul. 9, 1996

[54] SMALL PET CAR SEAT

[76] Inventor: Donald D. Gould, P.O. Box 260, Henderson, N.Y. 13650

[21] Appl. No.: 492,457

[22] Filed: Jun. 20, 1995

[51] Int. Cl.$^6$ .................................................. A47C 1/08
[52] U.S. Cl. .................................... 297/250.1; 297/188.01; 297/188.02
[58] Field of Search .......................... 297/250.1, 188.01, 297/188.19, 188.2; 119/769, 771, 784

[56] References Cited

U.S. PATENT DOCUMENTS

| | | | |
|---|---|---|---|
| D. 245,716 | 9/1977 | Russo | D30/41 |
| 1,822,638 | 9/1931 | Aiello | 297/188.01 |
| 1,967,533 | 7/1934 | Koop | 297/250.1 X |
| 2,317,894 | 4/1943 | Doty | 297/253 |
| 3,594,039 | 7/1971 | Harp | 297/252 |
| 3,797,462 | 3/1974 | Davis | 119/771 |
| 4,512,286 | 4/1985 | Rux | 119/771 |
| 4,818,017 | 4/1989 | Dykstra et al. | 297/188.19 X |
| 5,120,111 | 6/1992 | Cook | 297/188.01 X |
| 5,123,377 | 6/1992 | Edwards | 119/771 X |
| 5,133,294 | 7/1992 | Reid | 119/771 |

*Primary Examiner*—Milton Nelson, Jr.

[57] ABSTRACT

A small pet car seat comprising a planar support plate in a planar horizontal configuration having upstanding long side walls and having upstanding short front and rear edges in a box-like configuration. A forwardly extending support plate has an interior linear edge coupled to the forward upper edge of the side wall and with a semi-circular front edge. The supplemental plates include a large plate having a large aperture therethrough and a small plate for a small aperture therethrough. Downwardly extending legs are coupled at their upper edges with respect to the lower surface of the planar member. The legs have forward legs in a vertical orientation and rearward legs at an angle with respect to the vertical positionable against the back portion of a car seat.

1 Claim, 4 Drawing Sheets

SMALL PET CAR SEAT

BACKGROUND OF THE INVENTION

1. Field of the Invention

The present invention relates to small pet car seat and more particularly pertains to providing a place for a pet to ride where it can easily see out of the window of a vehicle and wherein eating capabilities are provided.

2. Description of the Prior Art

The use of pet cages, stalls and other devices of a wide variety of designs and configurations are known in the prior art. More specifically, pet cages, stalls and other devices of a wide variety of designs and configurations heretofore devised and utilized for the purpose of providing comfort and convenience to pets through a wide variety of methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,232,413 to Mongault discloses a device for use as a cot on the rear seat of a vehicle.

U.S. Pat. No. 4,723,814 to Hunt discloses a vehicle protection device.

U.S. Pat. No. Des. 245,716 to Russo discloses a car seat for a domestic animal.

U.S. Pat. No. 4,512,286 to Rux discloses a pet seat for automobiles.

Lastly, U.S. Pat. No. 4,943,105 to Kacar et al., discloses an automobile pet seat and cargo carrier.

In this respect, the small pet car seat according to the present invention substantially departs from the conventional concepts and designs of the prior art, and in so doing provides an apparatus primarily developed for the purpose of providing a place for a pet to ride where it can easily see out of the window of a vehicle and wherein eating capabilities are provided.

Therefore, it can be appreciated that there exists a continuing need for new and improved small pet car seat which can be used for providing a place for a pet to ride where it can easily see out of the window of a vehicle and wherein eating capabilities are provided. In this regard, the present invention substantially fulfills this need.

SUMMARY OF THE INVENTION

In view of the foregoing disadvantages inherent in the known types of pet cages, stalls and other devices of a wide variety of designs and configurations now present in the prior art, the present invention provides an improved small pet car seat. As such, the general purpose of the present invention, which will be described subsequently in greater detail, is to provide a new and improved small pet car seat apparatus and method which has all the advantages of the prior art and none of the disadvantages.

To attain this, the present invention essentially comprises a new and improved small pet car seat comprising, in combination, a planar support plate in a planar horizontal orientation and rectangular configuration having upstanding long side walls and having upstanding short front and rear walls in a box-like configuration. Forwardly extending support plates. Each support plate has an interior linear edge coupled to the front edge of the side wall at its upper extent and with a semi-circular front edge. The supplemental plates include a large plate having a large aperture therethrough and a small plate having a small aperture therethrough. A large dish with a circular cross section and a stepped central region is positioned within the large aperture. A large lid is positionable over the open upper edge of the large dish. A small dish with a circular cross section and a stepped central region is positioned within the small aperture. A small lid is positionable over the open upper edge of the small dish. Downwardly extending legs are coupled at their upper edges with respect to the lower surface of the planar member. The legs include forward legs in a vertical orientation and rearward legs at an angle with respect to the vertical positionable against the back portion of a car seat. A liner is positioned upon the upper surface of the planar member for the comfort of an animal therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved small pet car seat which has all the advantages of the prior art pet cages, stalls and other devices of a wide variety of designs and configurations and none of the disadvantages.

It is another object of the present invention to provide a new and improved small pet car seat which may be easily and efficiently manufactured and marketed.

It is a further object of the present invention to provide a new and improved small pet car seat which is of a durable and reliable construction.

An even further object of the present invention is to provide a new and improved small pet car seat which is susceptible of a low cost of manufacture with regard to both materials and labor, and which accordingly is then susceptible of low prices of sale to the consuming public, thereby making such pet cages, stalls and other devices of a wide variety of designs and configurations economically available to the buying public.

Still yet another object of the present invention is to provide a new and improved small pet car seat which provides in the apparatuses and methods of the prior art some of the advantages thereof, while simultaneously overcoming some of the disadvantages normally associated therewith.

Still another object of the present invention is to providing a place for a pet to ride where it can easily see out of the window of a vehicle and wherein eating capabilities are provided.

Lastly, it is an object of the present invention to provide a new and improved small pet car seat comprising a planar support plate in a planar horizontal configuration having upstanding long side walls and having upstanding short front and rear edges in a box-like configuration. A forwardly extending support plate has an interior linear edge coupled to the forward upper edge of the side wall and with a semi-circular front edge. The supplemental plates include a large plate having a large aperture therethrough and a small plate for a small aperture therethrough. Downwardly extending legs are coupled at their upper edges with respect to the lower surface of the planar member. The legs have forward legs in a vertical orientation and rearward legs at an angle with respect to the vertical positionable against the back portion of a car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein.

Similar reference characters refer to similar parts throughout the several views of the drawings.

DESCRIPTION OF THE PREFERRED EMBODIMENT

Figure 1:
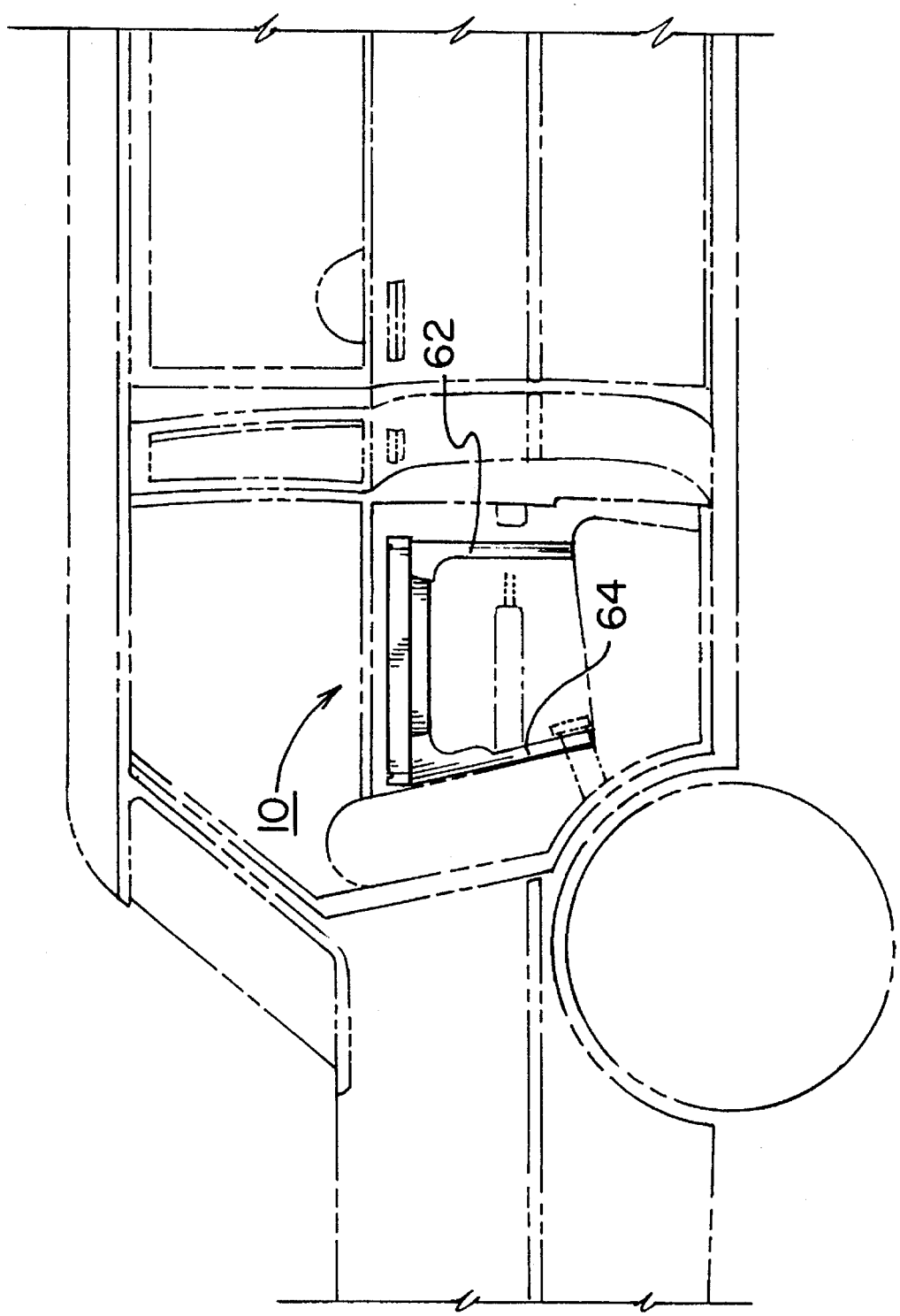
FIG. 1 is a side elevational view of the preferred embodiment of the small pet car seat constructed in accordance with the principles of the present invention.
Figure 2:
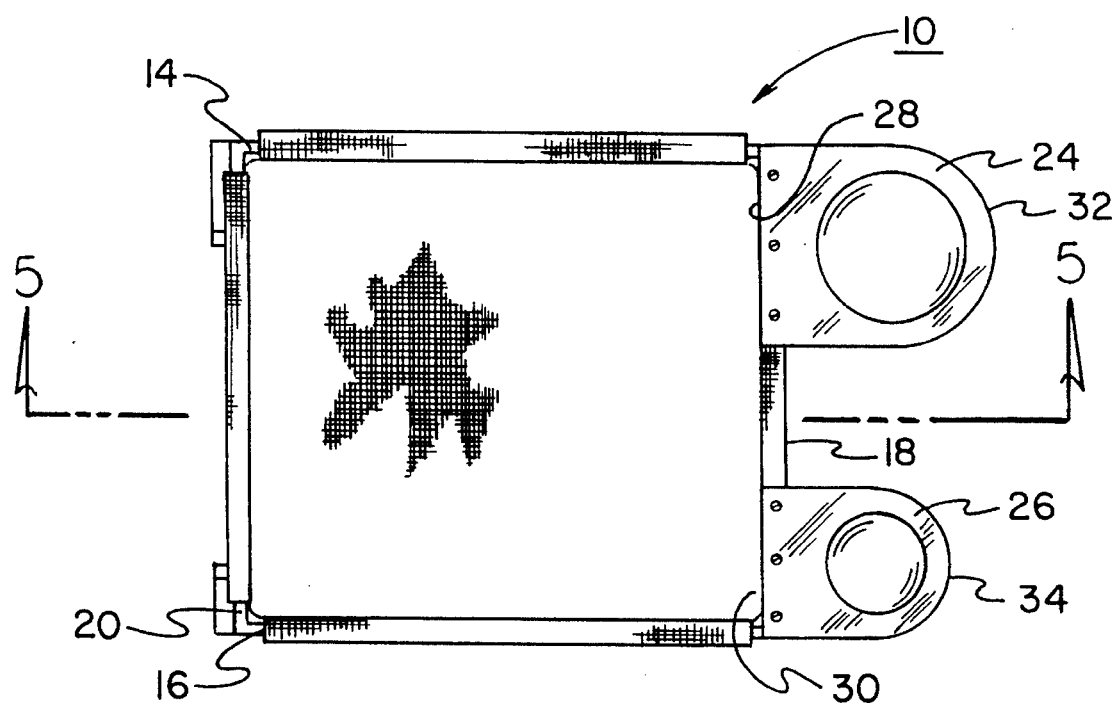
FIG. 2 is a top plan view of the device shown in FIG. 1.
Figure 3:
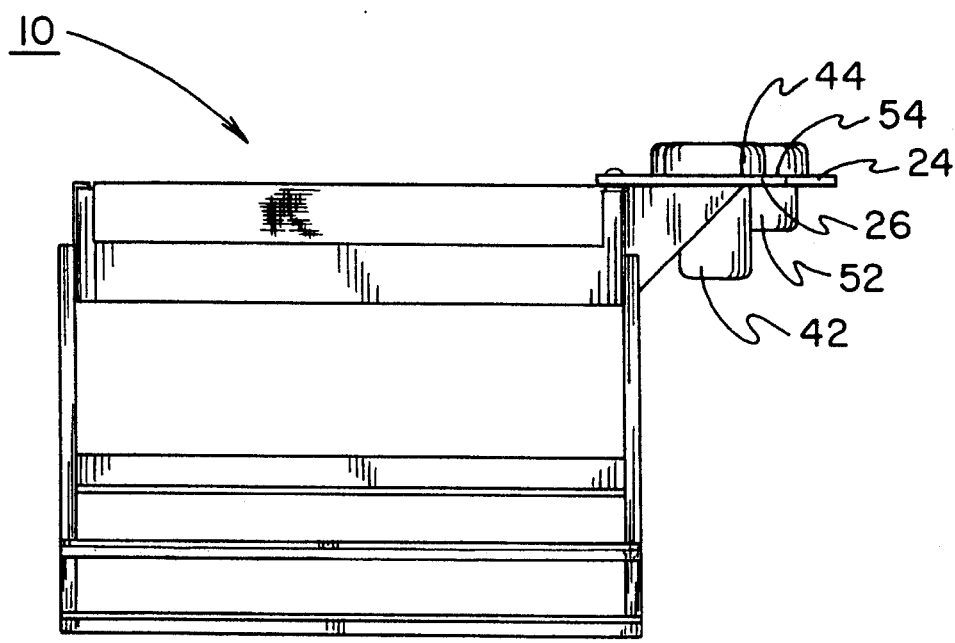
FIG. 3 is a front elevational view of the device shown in the prior Figures.
Figure 4:
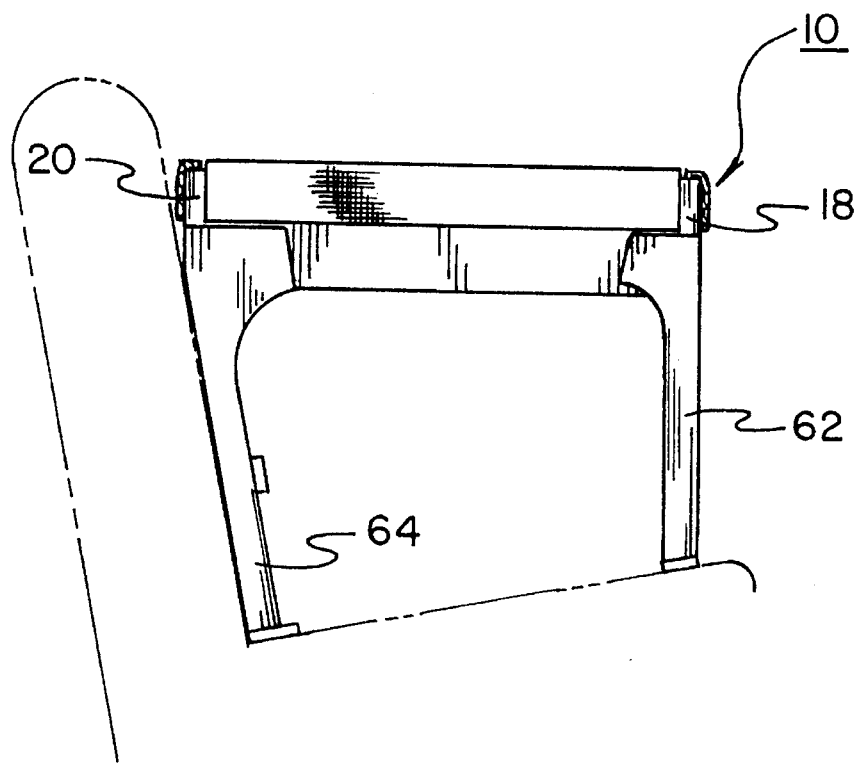
FIG. 4 is an enlarged side elevational view of the apparatus shown in the prior Figures.
Figure 5:
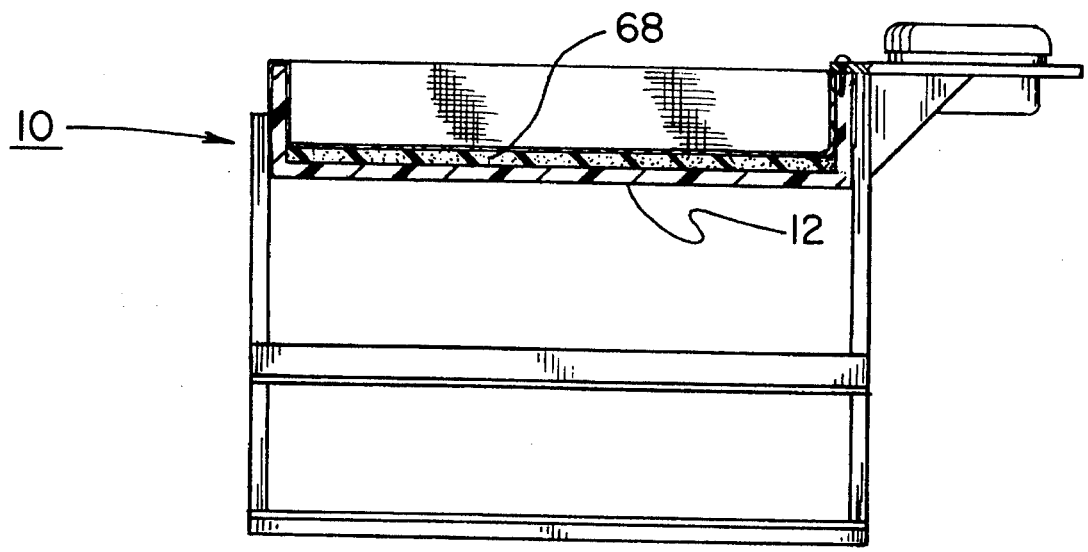
FIG. 5 is a cross sectional view taken along line 5—5 of FIG. 2.
Figure 6:
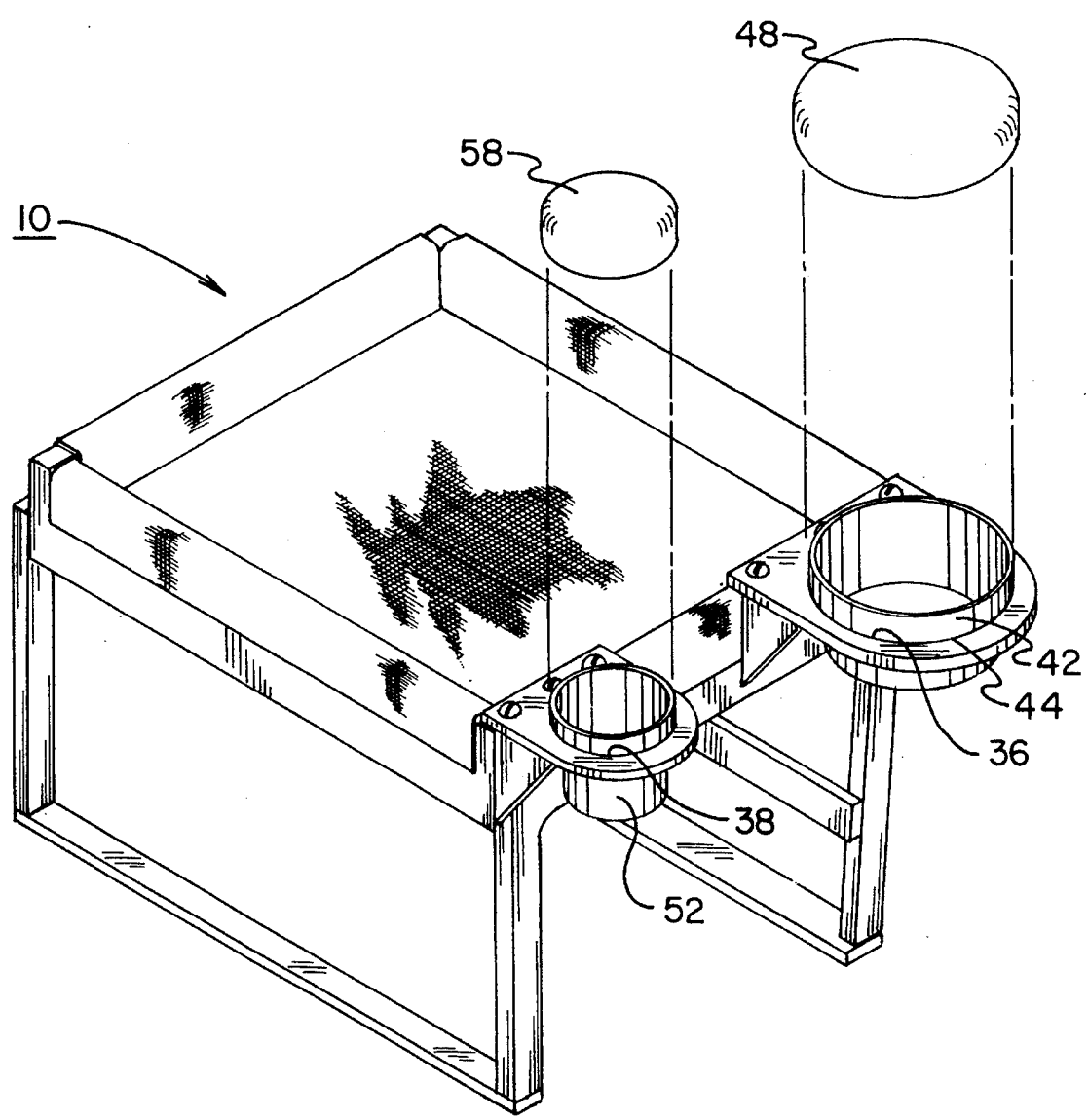
FIG. 6 is an exploded perspective illustration of the apparatus shown in the prior Figures.

With reference now to the drawings, and in particular to FIG. 1 thereof, a new and improved small pet car seat embodying the principles and concepts of the present invention and generally designated by the reference numeral 10 will be described.

The present invention, the new and improved small pet car seat, is comprised of a plurality of components. Such components in their broadest context include a planar support plate, support plates, a large dish, a large lid, a small dish, a small lid, legs and liner. Such components are individually configured and correlated with respect to each other so as to attain the desired objective.

More specifically, the pet car seat is a system 10 and has as its central component a planar support plate 12. Such plate is in a planar horizontal orientation. It is formed of a rectangular configuration. It has upstanding long side walls 14 and 16 as well as upstanding short front and rear walls 18 and 20. Together the wall form a box-like configuration with the support plate 12.

In addition to the main support plate 12 are a pair of forwardly extending support plates 24 and 26. Each of the support plates has an interior linear edge 28 and 30 coupled to the front edge of the side walls at its; upper extent. Each of the support plates has a semi-circular front edge 32 and 34. The supplemental plates include a large plate 24, having a large aperture 36 therethrough. The small plate 26 has a small aperture 38 therethrough.

Next provided is a large dish 42. Such large dish has a circular cross section with a stepped central region 44. This allows the large dish to be positioned within the large aperture and to be removable therefrom. In addition, a large lid 48 is positioned over the upper open edge of the large dish. Of a similar configuration is a small dish 52. Such small dish has a circular cross sectional configuration. It also has a stepped central region 54 rendering it capable of being removably positioned within the small aperture. A small lid 58 is provided for the small dish. The small lid is positionable over the open upper edge of the small dish.

Coupled with respect to the lower surface of the main support plate 12 are four downwardly extending legs. Such legs are coupled at their,upper edges with respect to the lower surface of the planar lower surface of the planar support plate 12. The legs include forward legs 62 oriented in a vertical orientation. The legs also include rearward legs 64. The rearward legs are formed at an angle of about ten degrees with respect to the vertical and are positionable against the back portion of a seat of a vehicle in which the system is to be located.

The last component of the system is a liner 68. Such liner is positioned on the upper surface of the planar support member 12. Such is providing comfort to an animal located thereon.

A raised platform that is secured by seat belts to the seat of a vehicle for the purpose of providing a place for a pet to ride where it can easily see out of the vehicle's window. The material of choice for this product is molded plastic. Two rungs on the bottom run horizontally across the width of roughly one seat. The rungs are connected to four support legs at the corners of the device. The rear legs rise up on an angle that parallels the angle of the seats themselves, leading o a platform on top. Carpeting on the platform provides a softer surface on which the pet can rest, and this carpet also prevents excessive heat buildup when the vehicle sits in the sun. Food and water dishes are built into two of the corners of the platform.

The platform is preferably positioned on one of the rear seats of the vehicle and then secured with two seat belts. The pet sits or lies on the platform, high enough to put its head out of the window without lowering the window completely. The built-in dishes provide readily accessible food and water. Accessories can be stowed under the platform if desired, as there is considerable open space under it. Traveling with pets can be tricky. This invention makes small animals more comfortable and, therefore, makes their owners happier too.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved small pet car seat comprising, in combination:

a planar support plate in a planar horizontal orientation and rectangular configuration having upstanding long side walls and having upstanding front and rear walls in a box-like configuration;

a pair of forwardly extending support plates, each having an interior linear edge coupled to a front edge of one of the long walls at an upper extent thereof, each of the support plates having a semi-circular front edge, one of the plates being a large plate having a large aperture therethrough and the other plate being a small plate having a small aperture therethrough;

a large dish with a circular cross section and a stepped central region positioned within the large aperture;

a large lid positionable over an open upper edge of the large dish;

a small dish with a circular cross section and a stepped central region positioned within the small aperture;

a small lid positionable over an open upper edge of the small dish;

downwardly extending legs coupled at their upper edges to a lower surface of the planar support plate, the legs including forward legs in a vertical orientation and rearward legs at an angle with respect to the forward legs and positionable against a back portion of a car seat; and a liner positioned upon the upper surface of the planar support plate for the comfort of an animal when located therein.

\* \* \* \* \*